(12) United States Patent
Do et al.

(10) Patent No.: US 9,262,391 B2
(45) Date of Patent: Feb. 16, 2016

(54) ANNOTATING A PRESENTATION IN A TELEPRESENCE MEETING

(71) Applicant: CISCO TECHNOLOGY, INC., San Jose, CA (US)

(72) Inventors: Dau Do, Milpitas, CA (US); Nermin Ismail, Fremont, CA (US); Brandon Gulrich, Richardson, TX (US); Dihong Tian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 379 days.

(21) Appl. No.: 13/867,697

(22) Filed: Apr. 22, 2013

(65) Prior Publication Data

US 2014/0292999 A1    Oct. 2, 2014

Related U.S. Application Data

(60) Provisional application No. 61/806,684, filed on Mar. 29, 2013.

(51) Int. Cl.
*G06F 17/24* (2006.01)
*H04N 7/15* (2006.01)
*H04L 29/06* (2006.01)

(52) U.S. Cl.
CPC ............ *G06F 17/241* (2013.01); *H04L 65/403* (2013.01); *H04L 65/602* (2013.01); *H04L 65/608* (2013.01); *H04N 7/15* (2013.01); *H04N 7/155* (2013.01)

(58) Field of Classification Search
None
See application file for complete search history.

(56) References Cited

U.S. PATENT DOCUMENTS

| | | | |
|---|---|---|---|
| 2002/0120939 A1* | 8/2002 | Wall et al. | 725/87 |
| 2004/0236830 A1* | 11/2004 | Nelson et al. | 709/204 |
| 2005/0104864 A1 | 5/2005 | Zhang et al. | |
| 2011/0061005 A1* | 3/2011 | Zha | 715/753 |
| 2011/0219060 A1* | 9/2011 | Ohwada | 709/203 |
| 2012/0254773 A1 | 10/2012 | Viswanathan | |
| 2012/0317483 A1 | 12/2012 | Shapiro et al. | |
| 2014/0063174 A1* | 3/2014 | Junuzovic et al. | 348/14.02 |

OTHER PUBLICATIONS

European Search Report from EP App. No. 14161604, Jun. 22, 2015, EP.

* cited by examiner

*Primary Examiner* — Fan Tsang
*Assistant Examiner* — Jeffrey Lytle
(74) *Attorney, Agent, or Firm* — Lempia Summerfield Katz LLC (57) ABSTRACT

A processing system can include an encoder to encode a real-time transmission of a presentation. A memory buffer can copy and store images of the presentation and convert the images into snapshot images. A transmitter can transmit the snapshot images to an external annotation device, and a receiver can receive annotation data of an annotation performed on the snapshot images at the external annotation device. The annotation can be encoded, in accordance with the annotation data, into the real-time transmission of the presentation to display the real-time transmission with the annotation.

18 Claims, 5 Drawing Sheets

ANNOTATING A PRESENTATION IN A TELEPRESENCE MEETING

TECHNICAL FIELD

This application relates generally to annotating a presentation in a telepresence, video conference or interactive meeting.

BACKGROUND

In typical telepresence and video conferencing meetings, users can share presentations by sending them as encoded video streams.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DESCRIPTION OF EXAMPLE EMBODIMENTS

OVERVIEW

According to exemplary implementations, a presentation in a telepresence meeting can be annotated, and the annotation can be executed by one or more processors, circuits, and computer hardware components, which can be configured to execute corresponding processes by software programming or discrete circuit designs, and can be distributed across a number of different machines.

A processing system can include an encoder to encode a real-time transmission of a presentation. A memory buffer can copy and store images of the presentation and convert the images into snapshot images. A transmitter can transmit the snapshot images to an external annotation device, and a receiver can receive annotation data of an annotation performed on the snapshot images at the external annotation device. The annotation can be encoded, in accordance with the annotation data, into the real-time transmission of the presentation to display the real-time transmission with the annotation. The annotation data can also be sent to another processing system, such as a processing system that is connected to the originating processing system by the Internet or other network, where the annotation data is encoded into the real-time transmission by the another processing system.

The memory buffer can store raw images of the presentation in an uncoded state and first and second copies of the raw images. The encoder can encode the raw images, the first copy of the raw images or the second copy of the raw images from the memory buffer to form the real-time transmission. A selection of which of the images to select can be based on the status of displaying an annotation. The snapshot images can be formed from the first copy of the raw images or second copy of the raw images in the memory buffer.

The annotation can be drawn in the memory buffer according to the annotation data in real-time on the second copy of the raw images in the memory buffer. Annotated snapshot images can be formed from the second copy of the raw images in the memory buffer and transmitted to the external annotation device, to provide real-time feedback of drawing the annotation on the external annotation device. The first copy of the raw images in the memory buffer can be utilized for forming the snapshots when the annotation is cleared. When the annotation is being coded into the real-time transmission of the presentation, the encoder can utilize the second copy of the raw images as annotated raw images.

The memory buffer can include logically or physically separated first, second and third buffers. The first buffer can store the raw images of the presentation in the uncoded state, and the second and third buffers can respectively store the first and second copies of the raw images. When the annotation is drawn in the memory buffer according to the annotation data in real-time on the second copy of the raw images in the memory buffer, the third buffer can store annotated raw images, which is a copy of the raw images stored in the first buffer having the annotation drawn thereon, and the second buffer can store un-annotated raw images, which is a copy of the raw images stored in the first buffer having no annotation drawn thereon.

The memory buffer can be a single buffer that stores raw images of the presentation in an uncoded state as well as copies (e.g., first and second copies) of the raw images. The memory buffer can also include logically or physically separated first, second and third buffers. The first buffer can store raw images of the presentation in an uncoded state, and the second and third buffers can each store a copy of the raw images from the first buffer.

The encoder can encode the raw images from the first buffer to form the real-time transmission, and the snapshot images can be formed from the copy of the raw images in the third buffer. The memory buffer can draw the annotation according to the annotation data in real-time on the copy of the raw images in the third buffer, such that annotated snapshot images are formed from the raw images in the third buffer and transmitted to the external annotation device, to provide real-time feedback of drawing the annotation on the external annotation device. The copy of the raw images in the second buffer can be utilized for forming the snapshots when the annotation is cleared. The annotation can be encoded into the real-time transmission of the presentation by the encoder utilizing annotated raw images in the third buffer.

The annotation data can be scaled to account for differences in size ratios between a display of the external annotation device and a display format of the real-time transmission. In some aspects, the annotation data can be scaled to account for pixel ratio differences between the display of the external annotation device and the display format of the real-time transmission. For example, the display of the external annotation device can be a 4:3 screen (e.g., 640×480, 1024×768 or 2,048×1,536 pixels) and the display format of the real-time transmission can be 16:9 (e.g., 640×360, 854×480, 960×540, 1024×576, 1280×720, 1366×768, 1600×900, 1920×1080, 2048×1152, 2560×1440, 3840×2160 or 4096×2304 pixels). However, other screen formats can be utilized in either the external annotation device or the real-time transmission, including wide-screen or cinema formats, 16:10, 5:3 and others.

The real-time transmission of the presentation can have a transmission video format that remains the same after the annotation is coded into the real-time transmission. In some aspects, a remote processing system that receives can receive a real-time transmission that has the same format and decoding requirements regardless of whether an annotation is included in the real-time transmission.

A display to display the presentation in a raw format can be provided. A field programmable gate array can be provided to route the presentation between the memory buffer and the display, and to accept the presentation as an input from a computer. A network adapter that includes the transmitter and the receiver can be provided.

The presentation can include one or more of a document, a whiteboard, a video, a still image and text.

The receiver can receive annotation data of annotations performed on the snapshot images at a plurality of external annotation devices, including the external annotation device and other external annotation devices. The annotations can be drawn, in real-time, on the images stored in the memory buffer to form annotated images. The snapshot images can be formed from the annotated images, and transmitted to the external annotation devices to provide real-time feedback of the annotations at each of the external annotation devices. The encoder can encode the real-time transmission, in real-time, based on the annotated images so that the real-time transmission provides a real-time of the annotations, as the annotations are being input to the external annotation devices. The system can further include the external annotation devices.

A processing system can include a decoder to decode a real-time transmission of a presentation. A memory buffer can copy images of the presentation and convert the images into snapshot images. A transmitter can transmit the snapshot images to a local external annotation device that is located locally to the processing system, and a receiver can receive local annotation data of an annotation performed on the snapshot images at the local annotation device. The local annotation data can be transmitted to a source of the real-time transmission to be encoded into the real-time transmission, so that the real-time transmission includes the annotation.

The real-time transmission of the presentation can include an annotation from a remote annotation device that is located remotely to the processing system. The source of the real-time transmission can be another processing system that is connected to the processing system by a network adapter and via the Internet.

Multiple sources of annotation data are possible, in which a processing system can, in real-time, plot or draw corresponding annotations on a presentation and encode the annotations and the presentation into a real-time transmission. The multiple sources of annotation data can be local to the processing system, remote to the processing system (and connected thereto by a network such as the Internet), or a combination of local and remote to the processing system. Remote multiple sources of annotation data can each be located at separate remote processing systems, and more than one remote source of annotation data can be located at a single remote processing system.

A method can include encoding a real-time transmission of a presentation; copying and storing images of the presentation, and converting the images into snapshot images; transmitting the snapshot images to an external annotation device; and receiving annotation data of an annotation performed on the snapshot images at the external annotation device, where the annotation is encoded, by a processor in accordance with the annotation data, into the real-time transmission of the presentation to display the real-time transmission with the annotation. A non-transitory computer-readable medium including computer-executable instructions that, when executed by computer processor, can cause the computer processor to execute the method. Steps of the method or a corresponding computer process can be executed by various means, including encoding, converting, decoding, processing, transmitting, and receiving means that correspond to computer hardware components or computer hardware components that are configured by computer software or computer code.

DETAILED DESCRIPTION OF EXEMPLARY IMPLEMENTATIONS

In the drawings, like reference numerals designate identical or corresponding parts throughout the several views. Further, as used herein, the words "a," "an" and the like generally carry a meaning of "one or more," unless stated otherwise.

Aspects of this disclosure include providing an annotation on a presentation (e.g., on snapshots of the presentation) and incorporating the annotation into existing presentation streams in telepresence systems. An exemplary telepresence system is a BFCP (binary floor control protocol) or H.239-compatible telepresence/UC (unified communications) endpoint.

According to aspects of this disclosure that are discussed below in relation to exemplary implementations, a procedure for performing an annotation can include:

A. Taking a snapshot (SS) of an image (local or remote), and storing a copy of the SS in a codec (i.e., a main processing unit).

B. Sending another copy of the SS to a touch/annotation device.

C. Annotating: a user draws/inputs annotations on the touch/annotation device (for local users), and the device sends annotation data (e.g., annotation vectors) to the codec.

D. Encoding and transmitting an image (e.g., a real-time transmission) that is encoded with annotations as continuous video to remote and/or local participants.

In the exemplary procedure discussed above, annotations can be updated live or in real-time continuously as the annotation is being created at the external annotation device (e.g., an in-touch device), so that a remote participant or other user can view that annotation as it is being created by a different user. Annotations can be made on any presentation shared by remote participants irrespective of a capability of an endpoint that shares the presentation. The annotation can be provided and updated in real-time, i.e., remote users can see the annotations (e.g., drawings) as they are being made and with very little delay. Remote users on endpoints that have no annotation capability are able to see the presentation and annotation naturally. In other words, if a local user (i.e., a user that is local to the processing unit that is generating/encoding a presentation) is drawing a circle, then the remote user should see the circle as it is being drawn, rather than merely seeing a circle after it has been fully drawn.

Annotations can be shown on the annotation device used to generate the annotation as well as on data displays available at the local endpoint (EP). Similar to remote users, the presentation and annotation should be seen naturally on the annotation device, and with even less delay than the case of remote users. Annotations can also be created, at the same time, by various users, in real-time, regardless of whether the users are local, remote, or a combination thereof.

Exemplary steps in exemplary implementations include: taking a presentation snapshot, whether it is shared locally or remotely; sending the snapshot to the control input device for displaying, where the snapshot is ready for annotation; and blending the annotation on the input device and at the local display.

Exemplary effects provided by the exemplary implementations include providing a blending ability of any screen size, with any type of background graphic format with annotation metadata, while sending out an annotated video as a standard video format that can be universally received by a device that is capable of receiving the standard video format, and a simple tool to scale, plot and blend a drawings (an annotation) in a way that the drawings appears as if it is drawn in real-time at a remote endpoint. The simple tool can handle multiple sources of metadata (annotation vectors), and blend it in real-time.

According to aspects of this disclosure, a legacy EP that has a capability to view standard video streams can view the annotation drawings in real-time (i.e., can display or view the circle drawing at the remote in real-time, instead of displaying the circle at the remote after circle is complete drawn), and multiple sources, of different graphic size, can be blended together in real-time. For instance, a plurality of users connected to each other through a plurality of different EPs can each be assigned a different annotation marker or color, so that separate annotations can be easily discerned, and corresponding coordinates (e.g., vectors) of annotations from different users can be simultaneously plotted and blended, and then encoded. While the legacy EP can view annotations, as discussed herein, the legacy EP may not be able to accept and/or act as a transceiver for metadata relating to an annotation or annotation data, such that the legacy EP cannot act as a source of annotation data. Consequently, in-touch or other display devices connected to the legacy EP may not be able to perform annotations in accordance with the disclosure, absent software or hardware modifications to further the capabilities of the legacy EP to include required functionality and/or hardware configurations/architecture.

In some exemplary implementations, a content channel can be treated as a video stream. In particular, data is captured, modified (with annotations), encoded, and transmitted as video frames. Frames can be encoded using a conventional or other video coding method.

From a user's perspective, aspects of this disclosure can be considered as treating content as a video stream. A video stream from any source, e.g., a camera pointing to a document, whiteboard, etc., may be captured and annotated. Combined with a triple-buffer architecture, a view can be returned to a non-annotated view (or switched in-between easily) without having to interrupt a real-time encoding or decoding process. Further, annotations can be shared in real-time to a first group of participants (such as, e.g., only local users), and then the annotations can be shared in real-time to a second group of participants (such as, e.g., remote users) only have the local users initiate annotation encoding. The local/remote users division is exemplary. The first group of participants can include a combination of local and remote users, and the second group of participants can include a combination of other local and remote users. The first group of participants can also include a combination of local and remote users, and the second group of participants can include a combination of other remote users. Any combination can be defined prior to a teleconference session or in real-time.

A triple-buffer implementation allows for a scratch version to be stored (e.g., in a loopback buffer) along with an original snapshot. As a result, it is possible to show the annotation (the scratch version stored in the loopback buffer) to local participants (or other user group) only, and at any point go back to the original snapshot. In one exemplary scenario, local participants can take a snapshot, do annotations locally (displayed locally in real-time, but not shown to remote participants) until one point, when the local participants decide to share the annotated version, then the remote participants can take over, interact, and/or collaboratively annotate together.

In an implementation of decoupled annotation input and display, a system can have a display (such as, e.g., a large central screen) that is decoupled from an annotation screen (which is a screen the annotation is inputted to). Local users can be provided with touch-based tablets, and annotation inputs from the local users on the tablets can be displayed on the decoupled display. However, because of a triple-buffer implementation, the displays of the tablets and/or the decoupled display can each show different images—an annotated image or an original image. Selection of either image can be made by an end-user or a master user or terminal. Further, the "original" image can be replaced with a differently annotated image. Thus, in a triple-buffer implementation two different sets of annotations can be stored for display.

Figure 1:
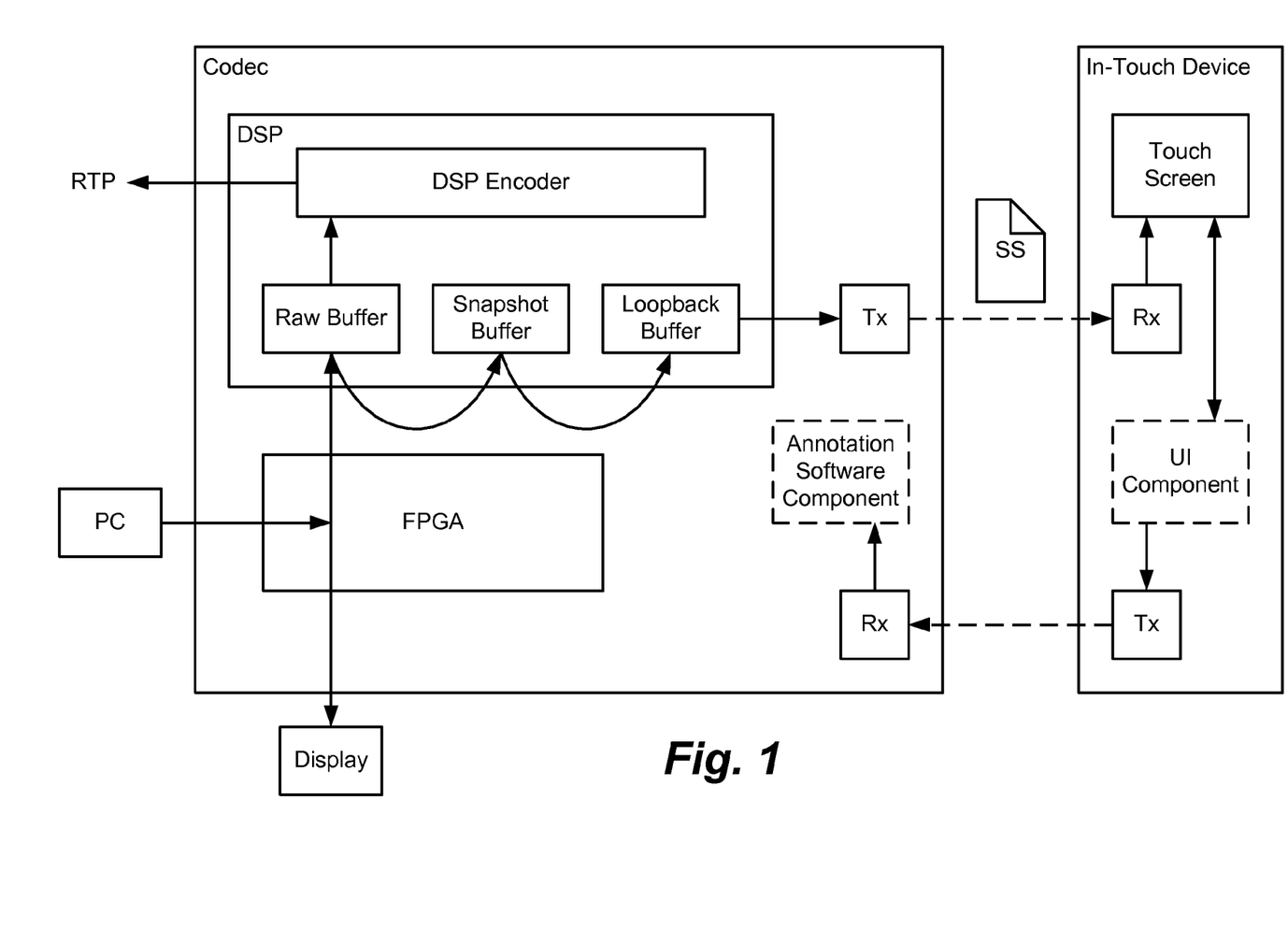
FIGS. 1-3 schematically illustrate exemplary hardware architectures and the use thereof in exemplary presentation scenarios with annotation.

FIG. 1 schematically illustrates an exemplary hardware architecture and the use of the hardware in an exemplary scenario when the presentation is locally shared.

In FIG. 1, a personal or portable computer (PC) provides a presentation to an FPGA (field programmable gate array) that accepts the presentation, and feeds the presentation to a DSP (digital signal processor). In FIG. 1, the DSP is in an encoding mode, which causes the DSP to encode, in the DSP Encoder, raw images (video) of the presentation into an RTP (real-time protocol or secure real-time protocol) stream/transmission, which is output to all of the EPs (endpoints) in the meeting. A local display, which is connected to the FPGA, can display the presentation directly from the PC.

The presentation (in raw images, prior to encoding) is buffered in a Raw Buffer. The Raw Buffer provides an output to the DSP Encoder and other buffers. When an annotation is made on the presentation, a snapshot (SS) of the raw buffer is taken. The SS is copied into two buffers: a Snapshot Buffer and a Loopback Buffer. Further buffers can also be provided. According to the exemplary implementations described herein, the Snapshot Buffer is utilized for supporting a clearing annotation feature, which allows the annotation to be cleared.

The SS is also copied and converted to a JPEG (JPG) format, and sent to in In-Touch Device for later displaying on a screen (Touch Screen) of the device, so that a user can annotate via the screen. The SS may also be copied and converted to another picture file format, other than JPEG, and the SS may also be a frame of a video stream that is copied from the DSP, and sent to the In-Touch Device. Since the In-Touch Device can have a different screen resolution than that of the presentation, or as that of the local display, a screen resolution conversion can take place in converting the SS (prior to sending the SS to the In-Touch Device).

In FIG. 1, the main unit that includes the FPGA and the DSP is a Codec, which refers to a main processing machine/device/apparatus. The Codec can include computer hardware components, which are discussed in further detail below, such as a transmitter Tx (for transmitting screenshots and other information to an In-Touch Device, wirelessly or by wire), and a receiver Rx (for receiving annotation data or other commands from the In-Touch Device, wirelessly or by wire).

The Codec can include an Annotation Software Component, which is an application or software configuration that can cause circuits of a Codec, such as a conventional Codec, to provide special functionality relating to annotation. Further, the In-Touch Device can include a User-Interface (UI) Component, which is an application or software configuration that can cause circuits of a computing system, such as a conventional tablet or touch-screen-enabled computing device, to provide special functionality relating to providing a user-interface for annotation. In one exemplary implementation, the In-Touch Device can be a tablet computer, such as one operating a proprietary operating system, such as Microsoft Windows, Android OS, Linux OS, Mac OS, iOS or UNIX, where the UI component can be provided as an installable or installed application program that operates on the operating system.

In an exemplary implementation, when a user of the In-Touch Device views a SS on the Touch Screen of the In-Touch Device, an annotation can be made via the UI Component. In particular, coordinates of the annotation can be recorded by the UI Component, and transmitted to the Annotation Software Component of the Codec. The coordinates can be stored as vectors, which can then be plotted or drawn onto the presentation, in real-time. Preset or pre-defined shapes can also be input/stored/transmitted, as well as text, images, video or other data, which can be stored as annotation data that can be sent, in real-time, to the Codec for processing or to the Codec for re-transmission to another Codec for processing.

In some aspects, a user of the In-Touch Device does not view annotations directly on the Touch Screen in response to performing an annotation. Rather, the annotation is displayed on the Touch Screen in response to annotation data being sent to the Codec, which is then plotted on the presentation (e.g., on a following SS), and then transmitted back to the In-Touch Device for display. This is only one exemplary implementation.

In another exemplary implementation, an instantaneous input on the Touch Screen can be shown as a first annotation of a first blending ratio or color on the Touch Screen in an unchanged/non-annotated screenshot, via processing performed entirely in the In-Touch Device. Concurrently, the In-Touch Device can output corresponding annotation data to the Codec. Then, a second annotation of a second blending ratio or color can be provided by the Codec, in response to receiving the annotation data, with annotated screenshots. The In-Touch Device can set the first annotation to fade away or disappear after a predefined time, and can thereby provide a more fluid and natural annotating process for a user. The predefined time can be set as a time that is approximately the same as a calculated delay between the In-Touch Device and the Codec, with respect to a time required to transmit annotation data, plot the annotation data, and receive/display a corresponding SS on the In-Touch Device. Also the first and second blending ratios or colors can be distinct so that the user is aware of any discrepancies. However, the ratios or colors can also be the same between the first and second annotations.

The Raw Buffer, the Snapshot Buffer, and the Loopback Buffer can be discrete memories, logically discrete portions of a common memory buffer, or a combination thereof. The Raw Buffer, the Snapshot Buffer, and the Loopback Buffer can be embodied in a single memory buffer. Additional buffers can also be provided for additional annotations that can be processed, controlled and displayed separately or independently.

Figure 2:
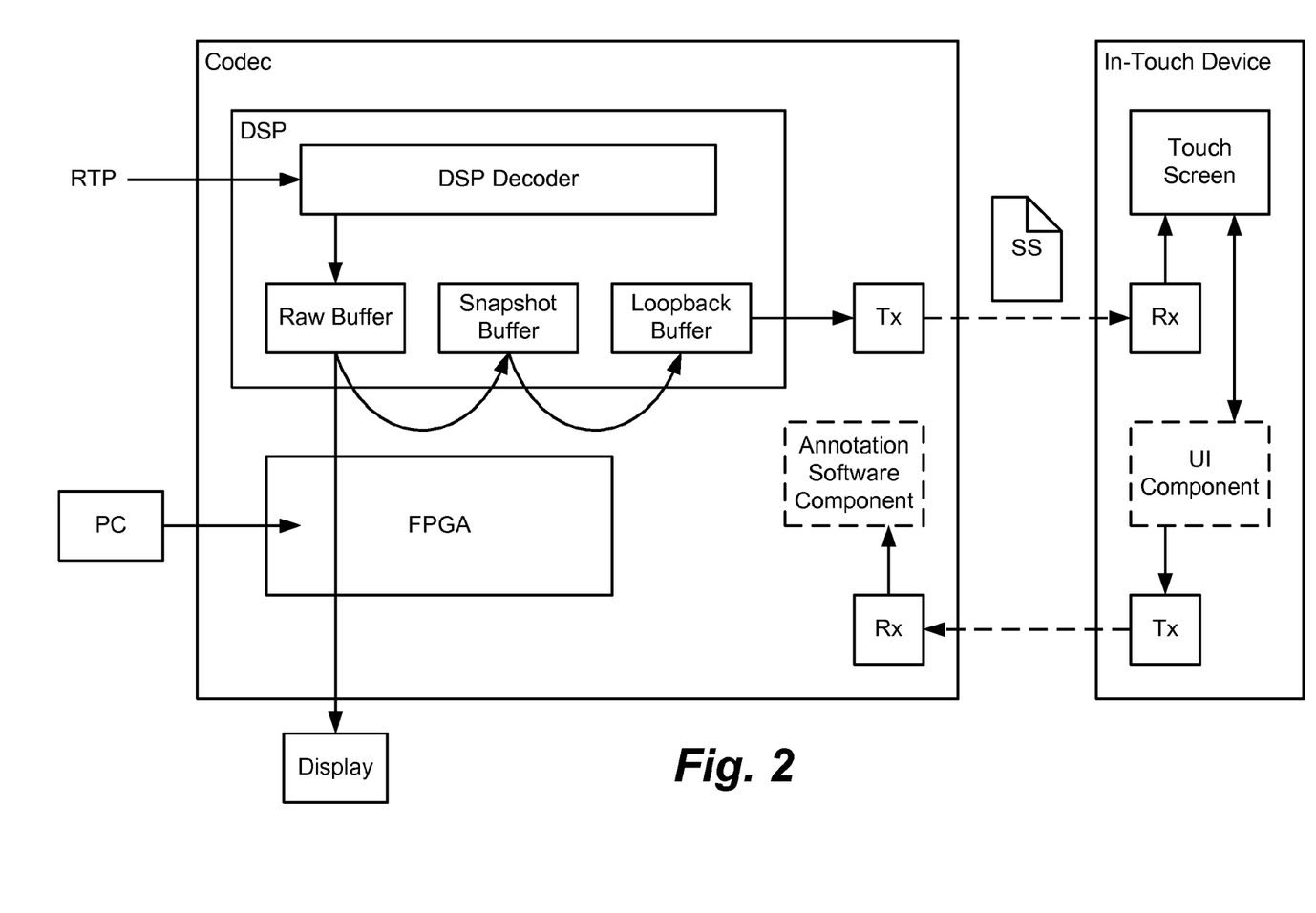

FIG. 2 schematically illustrates an exemplary hardware architecture and the use of the hardware in an exemplary scenario when the presentation is received from a remote EP. The hardware illustrated in FIG. 2 can be the same as or substantially similar to that illustrated in FIG. 1.

In FIG. 2, the presentation RTP stream is received (from a remote EP) and is decoded, and fed into the Raw Buffer. A raw frame in the Raw Buffer is sent through the FPGA and to the display on the data display. The FPGA can also output the raw frame to the PC, and the RTP or the raw frame can also be recorded on a mass storage device for later retrieval.

Here, it should be appreciated that FIG. 2 can be a conventional Codec that does not include annotation functions, where the annotations are already present in the RTP stream (having been encoded therein by, e.g., the hardware and process described with respect to FIG. 1). However, as illustrated in FIG. 2, the illustrated hardware does include the annotation functions.

When an annotation is made on the presentation, a snapshot of the raw buffer is taken and copied into two buffers, the Loopback Buffer and Snapshot Buffer. The Snapshot Buffer can provide support for a clearing annotation feature. The raw snapshot is copied and converted to a picture file format, such as a JPG format, and sent to the In-touch device for later posting on the screen for a user to annotate.

FIG. 2 schematically illustrates an exemplary hardware architecture and the use of the hardware in an exemplary scenario of switching to a stream from the Loopback buffer. The sequence can proceed by determining whether the DSP is loaded with an encoder. If not, the DSP can be reloaded as an encoder. The DSP can be switched from being a decoder or an encoder depending on a direction of a stream.

Once the DSP is reloaded as an encoder, streaming from the Loopback buffer is started, and routing from the raw buffer to the FPGA to the display is switched to the Loopback Buffer. The SS is also posted on the in-touch screen for the user to start making annotation.

As the user performs annotating on the SS on the Touch Screen, annotation data (e.g., coordinate data) is sent to the Codec and plotted into the Loopback buffer in the DSP. Since the DSP encoder continuously encodes the raw data from the Loopback Buffer, and sends out the result to remote end users (remote endpoints), the annotation will be displayed at the remote endpoint naturally, in a manner just similar to how the local user annotating his snapshot is displayed the annotation on the In-Touch device.

In an exemplary implementation, the In-Touch Device can support a 1366×768 screen resolution. If a SS is a 1920×1080 resolution, then the SS can be scaled to show in any size on the In-Touch Screen (such as a size that is of more or less resolution than the SS). A size of an annotation input can also be tracked. For instance, a width of the annotation can be tracked by a size of a pen input or a finger input. This width size can be varied by a software scaling. Otherwise, both coordinate and the pen size can be used to proportionally scale an annotation before sending the annotation to the codec to plot in the Loopback Buffer. Alternatively, if the Codec has a screen size configuration of the In-Touch Device stored beforehand, scaling can be performed by the Codec upon receipt thereof.

An exemplary scaling formula defines the following relationships:

$$Xp=(Wp*Xi)/Wi$$

$$Yp=(Hp*Yi)/Hi$$

$$Pp=Pi*(Wp*Hp)/(Wi*Hi)$$

(Xi, Yi)—the drawing coordinate on the scaled image shown on the In-Touch (Xp, Yp)—the drawing coordinate on the original snapshot (Wi, Hi)—the width and height of the picture shown on the In-Touch (Wp, Hp)—the width and height of the original snapshot Pi—the drawing pen size on the scaled image shown on the In-Touch Pp—the drawing pen size on original scaled image Both coordinate (Xp, Yp) and pen size Pp are sent from the In-Touch to the codec to plot in the Loopback Buffer. However, as discussed above, the Codec may already have this or corresponding information based on a predefined configuration. The pen size can be adjusted by a user, or based on a detected input at a device.

By scaling being performed between the Codec and the In-Touch, inputs can be properly translated into annotations, in their intended location, across a plurality of different resolution combinations.

Figure 3:
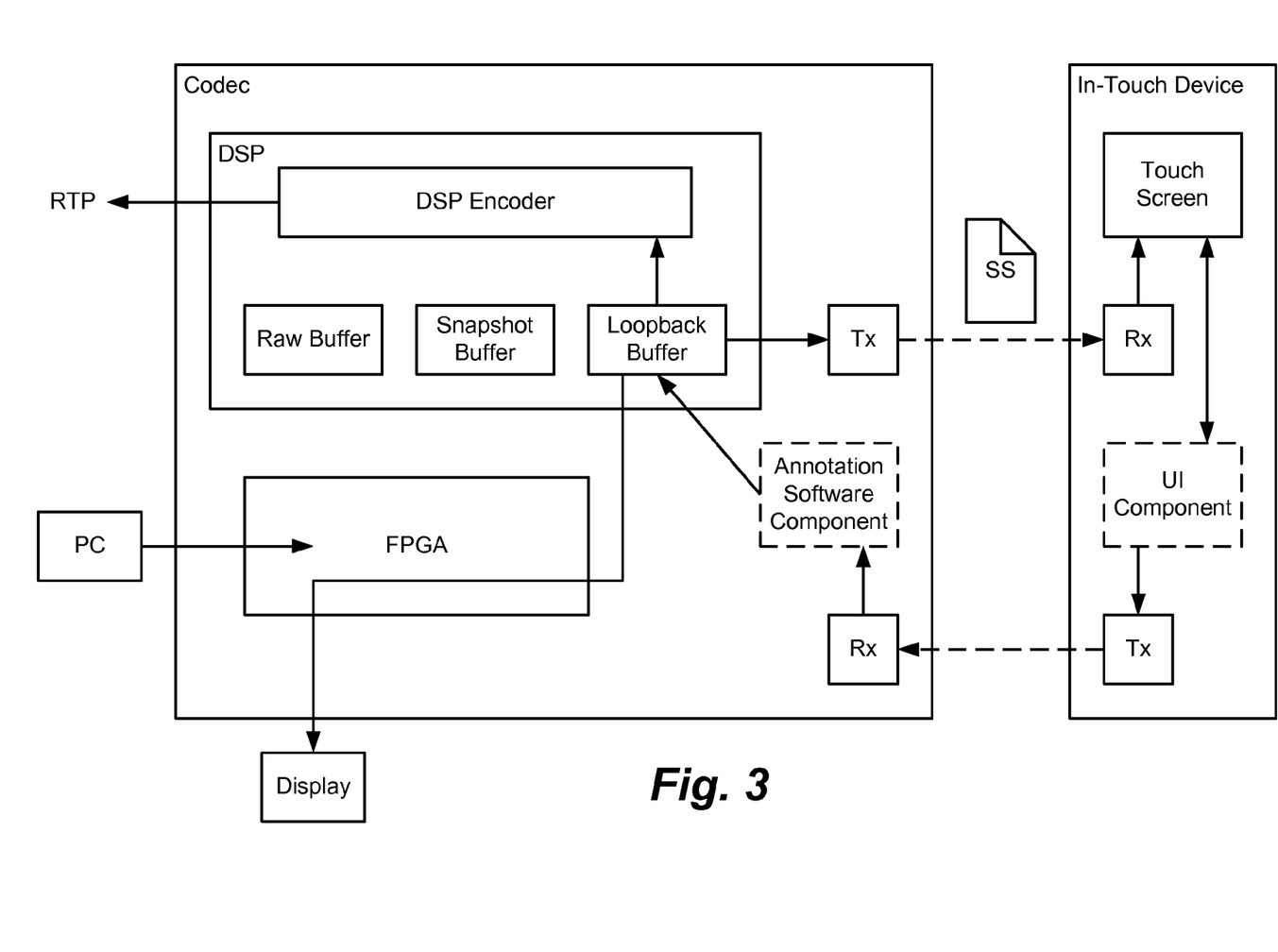
Figure 4A:
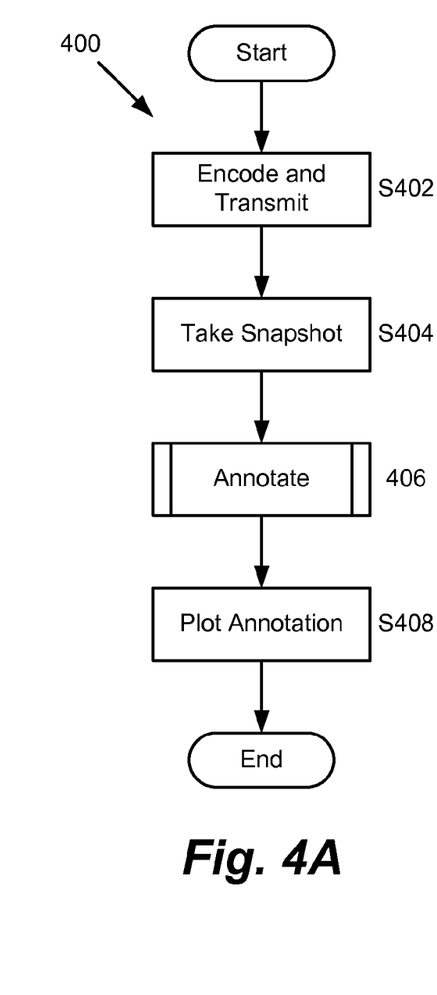
FIGS. 4A-4C illustrate exemplary algorithms for annotating procedures.
Figure 4B:
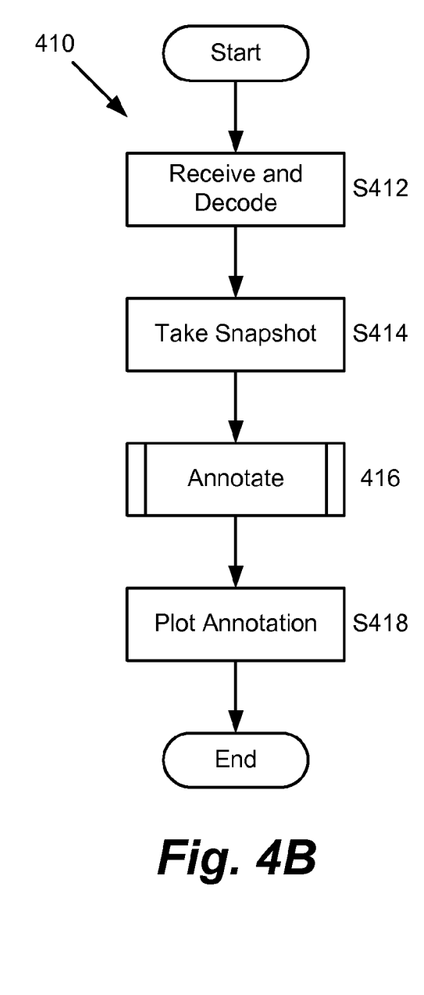
Figure 4C:
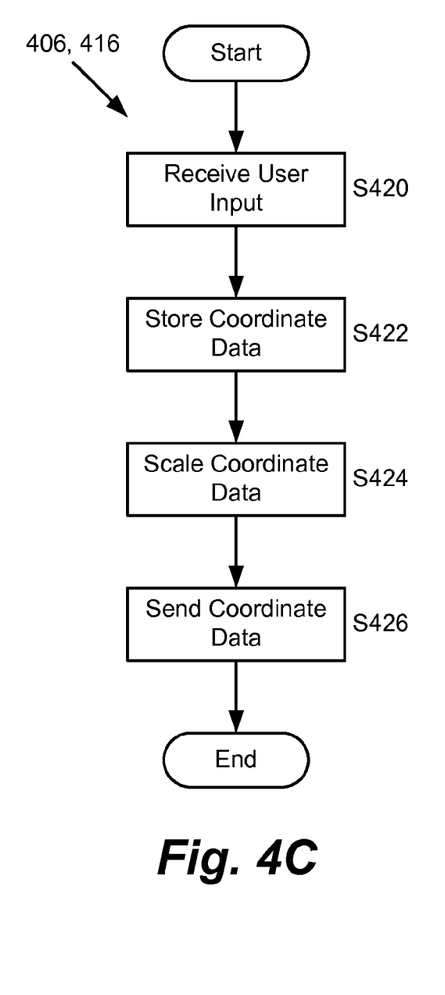
Figure 5:
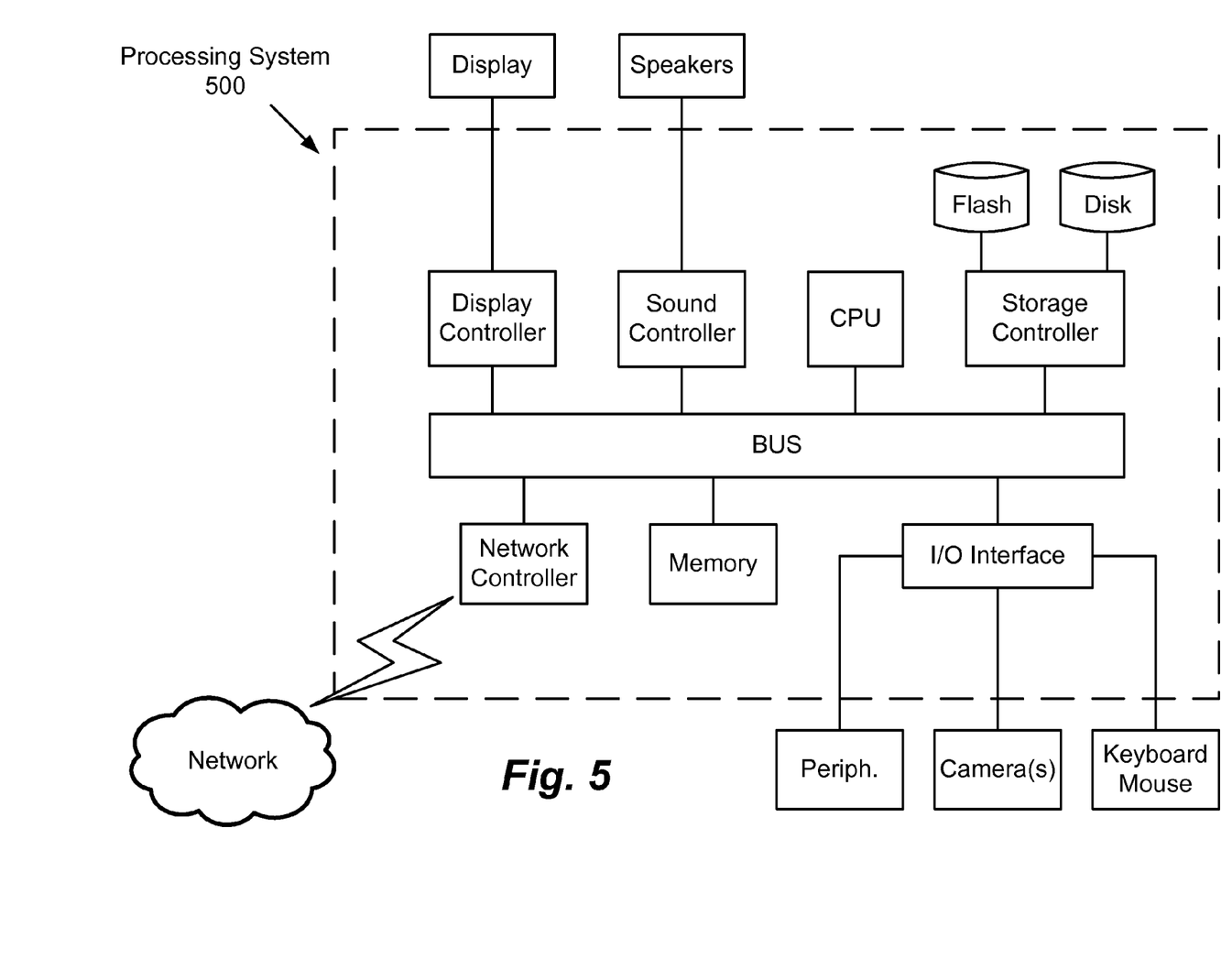
FIG. 5 illustrates an exemplary processing system.

FIGS. 4A-4C illustrate exemplary algorithms for annotating, by way of flow charts, that correspond to the processing and hardware described above with respect to FIGS. 1-3 and the exemplary processing system described in FIG. 5.

In FIG. 4A, a processing system (such as a Codec) encodes and transmits a presentation at S402. At S404, a snapshot (SS) is taken, and an annotation procedure 406 is performed. At S408, the annotation (e.g., the annotation data) is plotted onto the presentation, so that the annotation can be displayed on the presentation.

In FIG. 4B, a processing system (such as a Codec) receives and decodes a presentation at S412. At S414, a snapshot (SS) is taken, and an annotation procedure 416 is performed. At S418, the annotation (e.g., the annotation data) is plotted onto the presentation, so that the annotation can be displayed on the presentation. Since the processing system in FIG. 4B may not be an originator of the presentation, the annotation data can be transmitted to a processing system that originated the presentation to plot the annotation data. Also, if the presentation (i.e., a file of the presentation, such as a movie file or a Microsoft PowerPoint file) is shared across the processing system, a particular processing system that is forming the RTP can be switched based on a source of annotation, e.g., in a situation where a primary annotator is not local to the original processing system that forms the RTP.

An exemplary annotation procedure consistent with 406 and 416 is illustrated in the flowchart of FIG. 4C. Here, a user input is received at S420 by, e.g., a pen and a touch screen. Coordinate Data (e.g., annotation data) is stored at S422 that corresponds to a coordinate system of the touch screen and inputs received by the touch screen. The data can be stored as points, vectors, shapes, text or a combination thereof. Other visible or invisible annotations are also possible. The Coordinate Data is scaled at S424 (either by the input device or by a receiving device) to account for resolution or dimensional differences between the touch screen, another display screen or a native size of a presentation upon which the annotation is being performed. The scaled data is then sent to, e.g., a Codec or other Endpoint at S426 for incorporation/plotting on the presentation. The incorporation/plotting can include blending an annotation with a presentation, such that the annotation is opaque or translucent, allowing a portion of the presentation to show through a portion of the annotation. Other blending techniques can also be applied.

Aspects of the exemplary implementations provide for annotation on a presentation video in real-time. A blending ability of any size and any type of background in any graphic format, such as jpeg, raw, png, etc., with annotation data is provided, and a resulting annotated presentation stream can be sent out as a standard video format. In one exemplary implementation, the background can be just a clean-slate whiteboard background.

Scaling for plotting and blending is provided in such a way that the drawing will be seen in real-time at the remote endpoints. Annotation data can be handled local or remote, which allows two or more persons on a same Endpoint to draw simultaneously. The blending function from multiple annotation sources can be done in real-time, simultaneously, as it appears to two or more persons standing up at a whiteboard drawing at the same time.

In accordance with the above exemplary algorithms, a process can include: taking the presentation snapshot, whether it is shared locally or remotely, and storing the snapshot stored in a local loopback annotation buffer in the DSP, were this local loopback buffer is continuously encoded to send out as a RTP stream to conference meeting; sending the snapshot to the in-touch for displaying; and, for every annotation move on the In-Touch Device, corresponding annotation data is sent to the Codec and plotted on the local loopback annotation buffer in the DSP.

Adverting back to FIGS. 1-3, the blocks of architecture shown therein can be implemented in a single processing system, or distributed across a plurality of processing systems, which may be referred to as processors, Codecs, Endpoints or other machines and apparatuses. For instance, each of the blocks of architecture can be a discrete processor, circuit, system or logic component.

FIG. 5 illustrates an exemplary processing system or processor 500. One or more of such processing systems can be utilized in or to execute one or more algorithms, or portions thereof, or one or more architecture blocks, or portions thereof, in accordance with the descriptions provided herein.

The exemplary processing system 500 can be implemented using one or more microprocessors or the equivalent, such as a central processing unit (CPU) and/or at least one application specific processor ASP (not shown). The microprocessor is a circuit that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The procedures and routines described herein can be embodied as a system, method or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A processing system, comprising:
   an encoder to encode a real-time transmission of a presentation;
   a memory buffer to copy and store images of the presentation and convert the images into snapshot images including a first copy of the images and a second copy of the images;
   a transmitter to transmit the snapshot images to an external annotation device; and
   a receiver to receive annotation data of an annotation performed on the snapshot images at the external annotation device,
   wherein the annotation is encoded, in accordance with the annotation data, into the real-time transmission of the presentation to display the real-time transmission with the annotation,
   wherein the annotation is drawn in the memory buffer according to the annotation data in real-time on the second copy of the images in the memory buffer, such that annotated snapshot images are formed from the second copy of the images in the memory buffer and transmitted to the external annotation device, to provide real-time feedback of drawing the annotation on the external annotation device; and
   wherein the first copy of the images in the memory buffer is utilized for forming the snapshots when the annotation is cleared.

2. The processing system according to claim 1, wherein:
   the memory buffer stores the images as raw images of the presentation in an uncoded state and first and second copies of the raw images;
   the encoder encodes the raw images or one of the first and second copies of the raw images from the memory buffer to form the real-time transmission; and
   the snapshot images are formed from one of the first and second copies of the raw images in the memory buffer.

3. The processing system according to claim 1, wherein, when the annotation is being coded into the real-time transmission of the presentation, the encoder utilizes the second copy of the raw images as annotated raw images.

4. The processing system according to claim 3, wherein:
   the memory buffer includes logically or physically separated first, second and third buffers;
   the first buffer stores the raw images of the presentation in the uncoded state; and
   the second and third buffers respectively store the first and second copies of the raw images.

5. The processing system according to claim 4, wherein, when the annotation is drawn in the memory buffer according to the annotation data in real-time on the second copy of the raw images in the memory buffer, the third buffer stores annotated raw images, which is a copy of the raw images stored in the first buffer having the annotation drawn thereon, and the second buffer stores un-annotated raw images, which is a copy of the raw images stored in the first buffer having no annotation drawn thereon.

6. The processing system according to claim 3, wherein the annotation data is scaled to account for differences in size ratios between a display of the external annotation device and a display format of the real-time transmission.

7. The processing system according to claim 3, wherein the real-time transmission of the presentation has a transmission video format that remains the same after the annotation is coded into the real-time transmission.

8. The processing system according to claim 1, further comprising:
a display to display the presentation in a raw format.

9. The processing system according to claim 8, further comprising:
a field programmable gate array to route the presentation between the memory buffer and the display, and to accept the presentation as an input from a computer.

10. The processing system according to claim 1, further comprising:
a network adapter that includes the transmitter and the receiver.

11. The processing system according to claim 1, wherein the presentation includes one or more of a document, a whiteboard, a video, a still image and text.

12. The processing system according to claim 1, wherein:
the receiver is to receive annotation data of annotations performed on the snapshot images at a plurality of external annotation devices, including the external annotation device and other external annotation devices;
the annotations are drawn, in real-time, on the images stored in the memory buffer to form annotated images; and
the snapshot images are formed from the annotated images, and transmitted to the external annotation devices to provide real-time feedback of the annotations at each of the external annotation devices.

13. The processing system according to claim 12, wherein the encoder encodes the real-time transmission, in real-time, based on the annotated images so that the real-time transmission provides a real-time of the annotations, as the annotations are being input to the external annotation devices.

14. The processing system according to claim 13, further comprising the external annotation devices.

15. A processing system, comprising:
a decoder to decode a real-time transmission of a presentation;
a memory buffer to copy images of the presentation and convert the images into snapshot images including a first copy of the image and a second copy images;
a transmitter to transmit the snapshot images to a local external annotation device that is located locally to the processing system; and
a receiver to receive local annotation data of an annotation performed on the snapshot images at the local annotation device, wherein
the local annotation data is transmitted to a source of the real-time transmission to be encoded into the real-time transmission, so that the real-time transmission includes the annotation,
wherein the annotation is drawn in the memory buffer according to the annotation data in real-time on the second copy of the images in the memory buffer, such that annotated snapshot images are formed from the second copy of the images in the memory buffer and transmitted to the local external annotation device, to provide real-time feedback of drawing the annotation on the local external annotation device; and
wherein the first copy of the images in the memory buffer is utilized for forming the snapshots when the annotation is cleared.

16. The processing system according to claim 15, wherein the real-time transmission of the presentation includes an annotation from a remote annotation device that is located remotely to the processing system.

17. The processing system according to claim 16, wherein the source of the real-time transmission is another processing system that is connected to the processing system by a network adapter.

18. A method, comprising:
encoding a real-time transmission of a presentation;
copying and storing images of the presentation, and converting the images into snapshot images including a first copy of the images and a second copy of the images;
transmitting the snapshot images to an external annotation device; and
receiving annotation data of an annotation performed on the snapshot images at the external annotation device, wherein
the annotation is encoded, by a processor in accordance with the annotation data, into the real-time transmission of the presentation to display the real-time transmission with the annotation,
wherein the annotation is drawn according to the annotation data in real-time on the second copy of the images, such that annotated snapshot images are formed from the second copy of the images and transmitted to the external annotation device, to provide real-time feedback of drawing the annotation on the external annotation device; and
wherein the first copy of the images is utilized for forming the snapshots when the annotation is cleared.

* * * * *